United States Patent
Berezhnyy

(10) Patent No.: US 12,436,083 B2
(45) Date of Patent: Oct. 7, 2025

(54) SYSTEMS FOR DETECTING LIGHT BY BIREFRINGENT FOURIER TRANSFORM INTERFEROMETRY AND METHODS FOR USING SAME

(71) Applicant: Becton, Dickinson and Company, Franklin Lakes, NJ (US)

(72) Inventor: Ihor V. Berezhnyy, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 315 days.

(21) Appl. No.: 17/708,313

(22) Filed: Mar. 30, 2022

(65) Prior Publication Data
US 2022/0364978 A1  Nov. 17, 2022

Related U.S. Application Data

(60) Provisional application No. 63/188,620, filed on May 14, 2021.

(51) Int. Cl.
*G01N 15/1429* (2024.01)
*G01N 15/1434* (2024.01)

(52) U.S. Cl.
CPC ..... *G01N 15/1429* (2013.01); *G01N 15/1434* (2013.01); *G01N 2015/145* (2013.01); *G01N 2015/1454* (2013.01)

(58) Field of Classification Search
None
See application file for complete search history.

(56) References Cited

U.S. PATENT DOCUMENTS 4,076,422 A * 2/1978 Kohno ............... G01J 3/26
    356/454
4,905,169 A * 2/1990 Buican .............. G01J 9/0246
    356/453

(Continued)

FOREIGN PATENT DOCUMENTS

WO    WO2019082186 A1    5/2016

OTHER PUBLICATIONS

Cram, et al., "New Flow Cytometric Capabilities at the National Flow Cytometry Resource", Proceedings of the IEEE, IEEE. New York, vol. 80, No. 6, 1992, pp. 912-917.

*Primary Examiner* — Rufus L Phillips
(74) *Attorney, Agent, or Firm* — Khin K. Chin; Bret E. Field; BOZICEVIC, FIELD & FRANCIS LLP

(57) ABSTRACT

Aspects of the present disclosure include systems for detecting light from a particle by birefringent interferometry. Systems according to certain embodiments include a light source configured to irradiate a particle propagating through a flow stream, a light detection system that includes a birefringent polarizing interferometer configured to generate interfering polarized beams of light, a light adjustment component configured to continuously convey light from the irradiated particle across different positions on the birefringent polarizing interferometer as the particle is propagated through the flow stream, a photodetector configured to detect interference patterns of the interfering polarized beams of light generated by the birefringent polarizing interferometer from light collected from the irradiated particle and generate a photodetector signal pulse in response to each detected interference pattern. Systems also include a processor for transforming the photodetector signal pulses into spectral data signals. Methods for detecting light with the subject systems are also described. Kits having one or (Continued)

more components for detecting light according to the subject methods are also provided.

17 Claims, 9 Drawing Sheets

(56) References Cited

U.S. PATENT DOCUMENTS

| | | | |
|---|---|---|---|
| 6,421,131 B1 | 7/2002 | Miller et al. | |
| 9,151,943 B2 | 10/2015 | Sieracki et al. | |
| 10,048,192 B2 | 8/2018 | Hegyi | |
| 2006/0256335 A1 | 11/2006 | Chen et al. | |
| 2017/0322137 A1* | 11/2017 | Feher | G01N 15/1429 |
| 2018/0231453 A1* | 8/2018 | Kaye | G01N 15/1459 |
| 2019/0162646 A1 | 5/2019 | Scott et al. | |
| 2019/0383725 A1* | 12/2019 | Petersen | G01N 15/1459 |
| 2022/0348006 A1* | 11/2022 | Han | B41J 2/0456 |

* cited by examiner

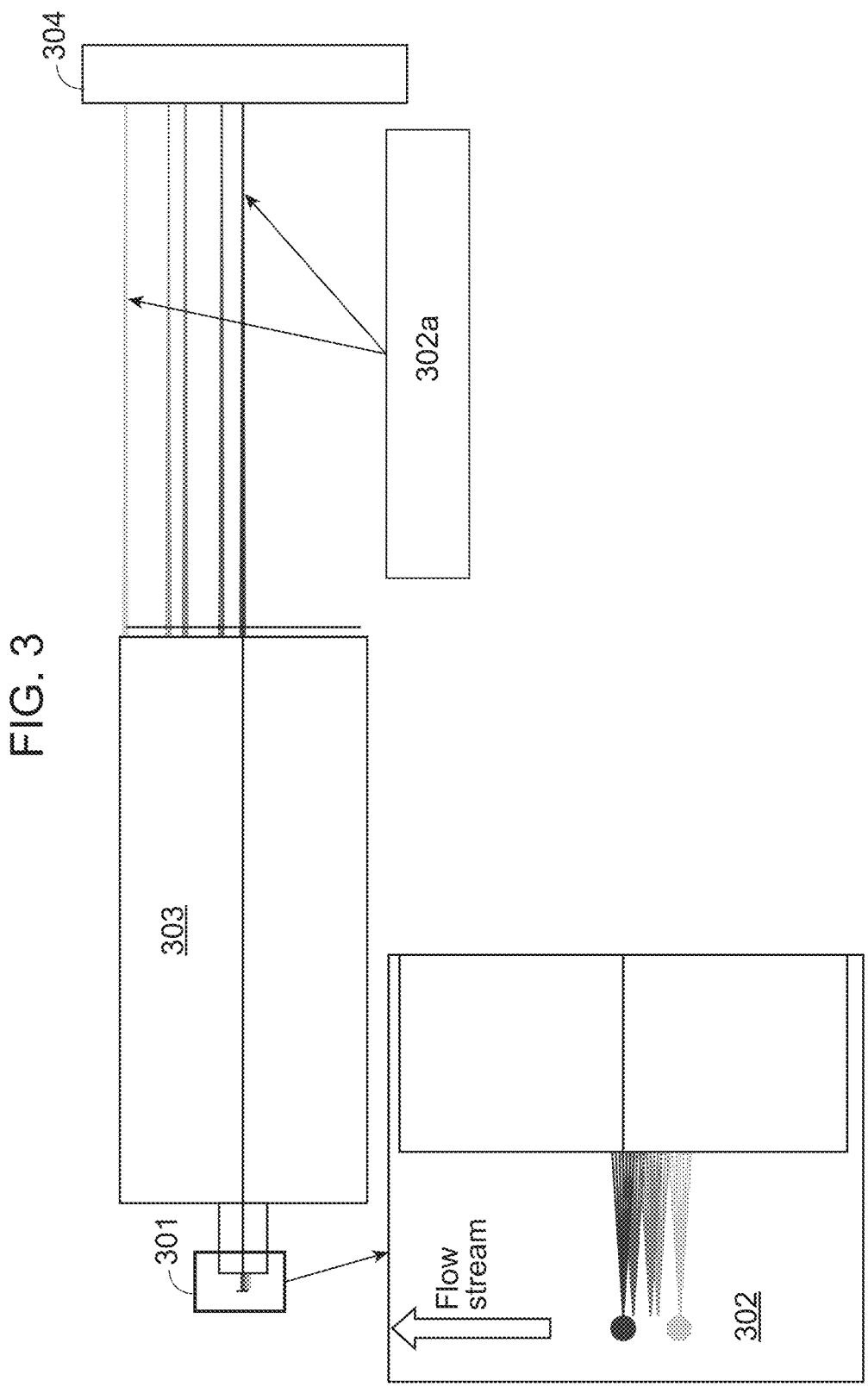

SYSTEMS FOR DETECTING LIGHT BY BIREFRINGENT FOURIER TRANSFORM INTERFEROMETRY AND METHODS FOR USING SAME

CROSS-REFERENCE TO RELATED APPLICATIONS

Pursuant to 35 U.S.C. § 119 (e), this application claims priority to the filing date of U.S. Provisional Patent Application Ser. No. 63/188,620 filed May 14, 2021; the disclosure of which application is incorporated herein by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector. The amount of light that reaches the detector can impact the overall quality of the optical signal outputted by the detector. The amount of light that reaches the detector can be raised by increasing the surface area of the detector or by increasing collection of the light from the sample.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include systems for detecting light from a particle in a flow stream by birefringent interferometry. Systems according to certain embodiments include a light source configured to irradiate a particle propagating through a flow stream, a light detection system that includes a birefringent polarizing interferometer configured to generate interfering polarized beams of light, a light adjustment component configured to continuously convey light from the irradiated particle across different positions on the birefringent polarizing interferometer as the particle is propagated through the flow stream, a photodetector configured to detect interference patterns of the interfering polarized beams of light generated by the birefringent polarizing interferometer from light collected from the irradiated particle and generate a photodetector signal pulse in response to each detected interference pattern.

In some embodiments, the light adjustment component configured to continuously convey light to the birefringent polarizing interferometer includes a double telecentric lens. In some instances, the light adjustment component is configured to convey collimated and perpendicularly incident light from the irradiated particle to the birefringent polarizing interferometer. In some embodiments, the light source continuously irradiates the particle propagating through the flow stream across an interrogation region of the flow stream of 10 µm or more, such as for example across an interrogation region of 1 mm or more. In certain instances, the interrogation region of the flow stream where the propagating particle is irradiated ranges from 0.01 mm to 10 mm. In some instances, light collected from the particle propagating through the flow stream is fluorescence. In some instances, light collected from the particle propagating through the flow stream is scattered light.

In some embodiments, the birefringent polarizing interferometer includes a first polarizer, a second polarizer, a prism and a lens. In some instances, the prism of the birefringent polarizing interferometer is configured to split a light beam from the first polarizer into two beams of polarized light having orthogonal polarizations. In certain instances, the prism is a Wollaston prism. In some instances, the light detection system includes a displacement component for adjusting one or more of the angles of the prism or the position of the prism of the birefringent polarizing interferometer. In some instances, the birefringent polarizing interferometer includes a focusing lens.

In certain instances, the birefringent polarizing interferometer generates beams of polarized light that constructively interfere at the photodetector. In other instances, the birefringent polarizing interferometer generates beams of polarized light that destructively interfere at the photodetector. Interference patterns generated by the birefringent polarizing interferometer are detected by the photodetector. In some instances, the interference patterns are focused to a position at the photodetector surface. In other instances, the interference patterns are focused to a position at a predetermined distance from the photodetector surface, such as 0.1 mm or more from the surface of the photodetector, such as 0.5 mm or more. In certain embodiments, the photodetector is configured to detect light from the birefringent polarizing interferometer in the absence of a spectral wavelength discriminator component.

In embodiments, the systems further include a processor configured to transform the photodetector signal pulses into spectral data signals. In some instances, the memory includes instructions stored thereon for generating the spectral data signals by performing a Fourier transform (FT) of the photodetector signal pulses. In some instances, the memory includes instructions stored thereon for generating the spectral data signals by performing a discrete Fourier transform (dFT) of the photodetector signal pulses. In some instances, the memory includes instructions stored thereon for generating the spectral data signals by performing a short-time Fourier transform (STFT) of the photodetector signal pulses. In certain instances, the memory includes instructions stored thereon for transforming the photodetector signal pulses into a spectrum based on the interference patterns detected by the photodetector. In some embodiments, the photodetector signal pulses are transformed into a spectrum with wavelengths that range from 200 nm to 1200 nm, such as from 360 nm to 960 nm. In certain embodiments, the particle analyzer is configured to generate a spectrum of the light from the irradiated particle in the absence of a spectral processing module. For example, the photodetector does not generate a spectral data signal.

In some embodiments, the transformed data signal has a unique shape or pattern. In certain embodiments, each transformed data signal has an identifiable shape or pattern, such as where the transformed data signal can be used to identify the components of the particle (e.g., fluorophores) or parameters of the particle (e.g., particle shape, size). In some embodiments, the memory includes instructions stored thereon which when executed by the processor, cause the processor to identify the particle in the flow stream based on the transformed data signal. In some embodiments, the memory includes instructions for generating a sort decision for the particle based on the transformed data signal. In other embodiments, systems include a particle sorter for sorting the particle based on the transformed data signal. In certain embodiments, the system is or is a part of a flow cytometer.

Aspects of the disclosure also include methods for detecting light from a particle in a flow stream by birefringent interferometry. Methods according to certain embodiments include irradiating with a light source a particle propagating through a flow stream, continuously conveying with a light adjustment component light from the irradiated particle across different positions on a birefringent polarizing interferometer as the particle is propagated through the flow stream, generating with the birefringent polarizing interferometer interference patterns of interfering polarized beams of light, detecting the interference patterns with a photodetector, generating a photodetector signal pulse in response to each detected interference pattern and transforming the photodetector signal pulses into spectral data signals.

In some embodiments, the methods include detecting fluorescence from the particle. In other embodiments, the methods include detecting scattered light from the particle. In other embodiments, the methods include detecting fluorescence and scattered light from the particle. In some embodiments, light from the particle is continuously conveyed through a double telecentric lens across different positions on the birefringent polarizing interferometer. In some instances, the double telecentric lens conveys collimated and perpendicularly incident light from the irradiated particle to each position on the birefringent polarizing interferometer. In some embodiments, methods include continuously irradiating the particle propagating through the flow stream across an interrogation region of the flow stream of 10 μm or more, such as for example across an interrogation region of 1 mm or more. In certain instances, the interrogation region of the flow stream where the propagating particle is irradiated ranges from 0.01 mm to 10 mm.

In some embodiments, light is conveyed from the light adjustment component to a birefringent polarizing interferometer that includes a first polarizer, a second polarizer, a prism and a lens. In some instances, light from the light adjustment component (e.g., double telecentric lens) is propagated through a first polarizer to generate a light beam having a first polarization, propagating the polarized light through a prism to generate two beams of light, propagating the two beams of light through a second polarizer to generate two beams of light having different polarizations and focusing the two beams of polarized light onto the photodetector to generate an interference pattern between the two beams of polarized light at the photodetector.

In some instances, the prism of the birefringent polarizing interferometer is configured to split a light beam from the first polarizer into two beams of polarized light having orthogonal polarizations. In certain instances, the prism is a Wollaston prism. In some instances, the light detection system includes a displacement component for adjusting one or more of the angles of the prism or the position of the prism of the birefringent polarizing interferometer. In some instances, the birefringent polarizing interferometer includes a focusing lens. In certain instances, the birefringent polarizing interferometer generates beams of polarized light that constructively interfere at the photodetector. In other instances, the birefringent polarizing interferometer generates beams of polarized light that destructively interfere at the photodetector.

In some instances, the methods include detecting the interference patterns generated by the birefringent polarizing interferometer that is focused at the detector surface. In other instances, the methods include detecting the interference patterns generated by the birefringent polarizing interferometer that is focused at a predetermined distance from the photodetector surface, such as 0.1 mm or more from the surface of the photodetector, such as 0.5 mm or more. In some instances, methods include detecting light from the birefringent polarizing interferometer in the absence of a spectral wavelength discriminator component.

In embodiments, the methods further include transforming the photodetector signal pulse into spectral data signals. In some instances, the methods include transforming the photodetector signal pulses into spectral data signals by performing a Fourier transform (FT) of the photodetector signal pulses. In other instances, the methods include transforming the photodetector signal pulses into spectral data signals by performing a discrete Fourier transform (dFT) of the photodetector signal pulses. In other instances, methods include transforming the photodetector signal pulses into spectral data signals by performing a short-time Fourier transform (STFT) of the photodetector signal pulses. In certain instances, the methods include transforming the photodetector signal pulses into a spectrum based on the interference patterns detected by the photodetector. In some embodiments, the methods include transforming the photodetector signal pulses into a spectrum with wavelengths that range from 200 nm to 1200 nm, such as from 360 nm to 960 nm.

In some embodiments, the methods include characterizing a particle based on the pattern or shape of the transformed data signal. For example, one or more parameters of the particle may be determined based on the transformed data signal. In some instances, the methods include identifying the particle based on the pattern or shape of the transformed data signal. In some instances, a sort decision for sorting the particle is generated based on the identified particle. In certain instances, the methods include sorting the particle based on the transformed data signal.

BRIEF DESCRIPTION OF THE FIGURES

The invention may be best understood from the following detailed description when read in conjunction with the accompanying drawings. Included in the drawings are the following figures:

FIG. 3 depicts an illustration of light from a particle irradiated while being propagated through a flow stream according to certain embodiments.

DETAILED DESCRIPTION

Figure 1:
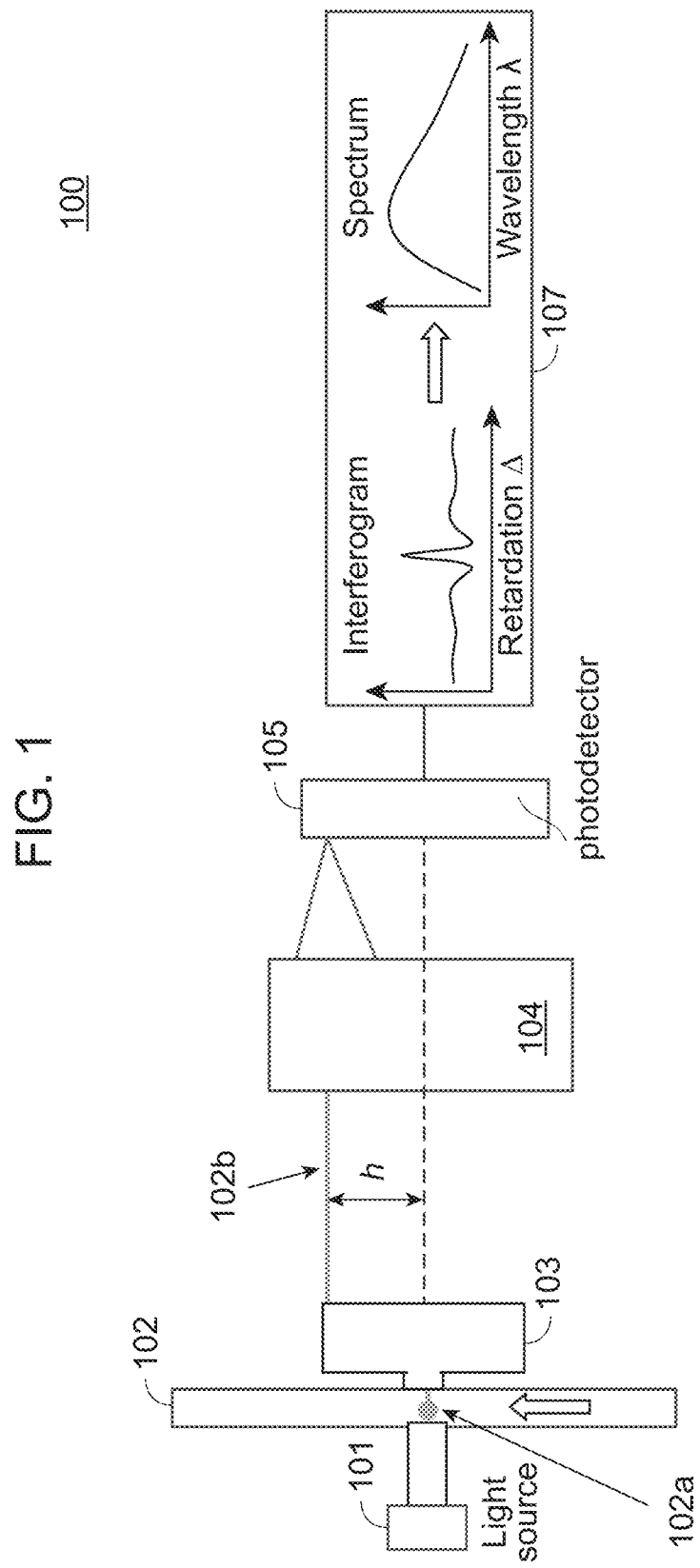
FIG. 1 depicts a light detection system for detecting light from a particle in a flow stream by birefringent interferometry according to certain embodiments.

Aspects of the present disclosure include systems for detecting light from a particle by birefringent interferometry. Systems according to certain embodiments include a light source configured to irradiate a particle propagating through a flow stream, a light detection system that includes a birefringent polarizing interferometer configured to generate interfering polarized beams of light, a light adjustment component configured to continuously convey light from the irradiated particle across different positions on the birefringent polarizing interferometer as the particle is propagated through the flow stream, a photodetector configured to detect interference patterns of the interfering polarized beams of light generated by the birefringent polarizing interferometer from light collected from the irradiated particle and generate a photodetector signal pulse in response to each detected interference pattern. Systems also include a processor for transforming the photodetector signal pulses into spectral data signals. Methods for detecting light with the subject systems are also described. Kits having one or more components for detecting light according to the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems and methods for detecting light from particles in a flow stream (e.g., in a particle analyzer) by birefringent interferometry. In further describing embodiments of the disclosure, systems having a light source configured irradiate a particle propagating through a flow stream, a light detection system that includes a birefringent polarizing interferometer configured to generate interfering polarized beams of light, a light adjustment component configured to continuously convey light from the irradiated particle across different positions on the birefringent polarizing interferometer, a photodetector configured to detect interference patterns of the interfering polarized beams of light are first described in greater detail. Next, methods for detecting light by birefringent interferometry with the subject systems are described. Kits having one or more components of the subject detecting systems are described.

Systems for Detecting Light from Particles in a Flow Stream by Birefringent Interferometry Aspects of the present disclosure include systems for detecting light from a particle in a flow stream by birefringent interferometry. Systems according to certain embodiments include a light source configured to irradiate a particle propagating through a flow stream, a light detection system that includes a birefringent polarizing interferometer configured to generate interfering polarized beams of light, a light adjustment component configured to continuously convey light from the irradiated particle across different positions on the birefringent polarizing interferometer as the particle is propagated through the flow stream, a photodetector configured to detect interference patterns of the interfering polarized beams of light generated by the birefringent polarizing interferometer from light collected from the irradiated particle and generate a photodetector signal pulse in response to each detected interference pattern.

In embodiments, the systems include a light source for irradiating a particle propagating through a flow stream. In some embodiments, the light source continuously irradiates the particle propagating through the flow stream across an interrogation region of the flow stream of 5 µm or more, such as 10 µm or more, such as 15 µm or more, such as 20 µm or more, such as 25 µm or more, such as 50 µm or more, such as 75 µm or more, such as 100 µm or more, such as 250 µm or more, such as 500 µm or more, such as 750 µm or more, such as for example across an interrogation region of 1 mm or more, such as 2 mm or more, such as 3 mm or more, such as 4 mm or more, such as 5 mm or more, such as 6 mm or more, such as 7 mm or more, such as 8 mm or more, such as 9 mm or more and including 10 mm or more.

In some embodiments, the light source is configured to irradiate a planar cross-section of the propagated flow stream or may be configured to facilitate irradiation of a diffuse field (e.g., with a diffuse laser or lamp) of a predetermined length. In some embodiments, the region of the flow stream interrogated by the light source in the subject systems includes a transparent window that facilitates irradiation of a predetermined length of an emanating flow stream, such as 0.0001 mm or more, such as 0.0005 mm or more, such as 0.001 mm or more, such as 0.005 mm or more, such as 0.01 mm or more, such as 0.05 mm or more, such as 0.1 mm or more, such as 0.5 mm or more, such as 1 mm or more and including 5 mm or more. Depending on the light source used to irradiate the flow stream (as described below), the transparent window which facilitates irradiation of the flow stream by the light source may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In embodiments, the systems include a light source for irradiating the particle propagating through in the flow stream. In some embodiments, the light source is a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, the light source includes one or more pulsed light sources, such as where light is emitted at predetermined time intervals, each time interval having a predetermined irradiation duration (i.e., pulse width). In certain embodiments, the pulsed light source is configured to continuously irradiate the particle propagating through the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

Systems may include any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, the light source includes a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

In some embodiments, the light source emits light having wavelengths that overlap, such as where the output spectrum of one or more components of the lights source overlap by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more. In some embodiments, the wavelengths of light emitted by the light sources exhibit no overlap. For example, the output spectrum of the light sources may be separated by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more.

The light source may be positioned by any suitable distance from the flow stream, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow stream such as at an angle ranging from 10° to 90°, such as from 15° to 85°, such as from 20° to 80°, such as from 25° to 75° and including from 30° to 60°, for example at a 90° angle.

Light sources according to certain embodiments may also include one or more optical adjustment components. The term "optical adjustment" is used herein in its conventional sense to refer to any device that is capable of changing the spatial width of irradiation or some other characteristic of irradiation from the light source, such as for example, irradiation direction, wavelength, beam width, beam intensity and focal spot. Optical adjustment protocols may be any convenient device which adjusts one or more characteristics of the light source, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics.

As described above, systems are configured to irradiate a particle propagating through a flow stream and light from the irradiated particle is continuously conveyed through a light adjustment component to different positions on a birefringent polarizing interferometer as the particle is propagated through the flow stream. In some instances, light from the irradiated particle is emitted light such as fluorescence from the particle. In some instances, light from the irradiated particle is scattered light. In some cases, the scattered light is forward scattered light. In some cases, the scattered light is backscattered light. In some cases, the scattered light is side scattered light. In some instances light from the irradiated particle is transmitted light.

Light from the particle is continuously conveyed to different positions along the birefringent polarizing interferometer as the particle propagates through the flow stream with a light adjustment component. In some instances, the light adjustment component is configured to expand the spatial separation of the light collected from the particle in the flow stream. In some instances, the light adjustment component expands the spatial separation by 5% or more, such as by 10% or more, such as by 25% or more, such as by 50% or more, such as by 75% or more, such as by 90% or more. In certain instances, the light adjustment component expands the spatial separation by 1.1-fold or more, such as by 1.2-fold or more, such as by 1.3-fold or more, such as by 1.4-fold or more, such as by 1.5-fold or more, such as by 2-fold or more, such as by 3-fold or more, such as by 4-fold or more, such as by 5-fold or more, such as by 6-fold or more, such as by 7-fold or more, such as by 8-fold or more, such as by 9-fold or more and including by 10-fold or more.

In some embodiments, the light adjustment component collimates the light collected from the particle and conveys collimated light to the birefringent polarizing interferometer. The term "collimate" is used in its conventional sense to refer to the optically adjusting the collinearity of light propagation or reducing divergence by the light of from a common axis of propagation. In some instances, collimating the light from the particle includes narrowing the spatial cross section of a light beam that is continuously propagated along the birefringent polarizing interferometer. In other instances, the light adjustment compound changes the direction of the collimated light beam, such as changing the propagation of the light beam by 1° or more, such as by 5° or more, such as by 10° or more, such as by 15° or more, such as by 20° or more, such as by 25° or more, such as by 30° or more, such as by 45° or more, such as by 60° or more, such as by 75° or more and including changing the direction of light propagation by 90° or more. In yet other instances, the light adjustment component de-magnifies the light collected from the particle so as to decrease the dimensions of the light (e.g., beam spot) that is continuously conveyed along the birefringent polarizing interferometer, such as decreasing the dimensions by 5% or more, such as by 10% or more, such as by 25% or more, such as by 50% or more and including decreasing the dimensions by 75% or more.

In some embodiments, the light adjustment component is configured to convey incident light from the irradiated particle to the birefringent polarizing interferometer at an angle that varies from 60° to 90° relative to the surface of the birefringent polarizing interferometer, such as from 65° to 90°, such as from 70° to 90°, such as from 75° to 90°, 80° to 90° and including from 85° to 90° relative to the surface of the birefringent polarizing interferometer. In certain embodiments, the light adjustment component is configured to convey perpendicularly incident light from the irradiated particle to the surface of the birefringent polarizing interferometer (i.e., the incident light from the light adjustment component is orthogonal to the surface of the birefringent polarizing interferometer)

The light adjustment component may be any convenient optical protocol for collecting and continuously conveying light along the birefringent polarizing interferometer from the particle propagating through the flow stream. In some embodiments, the light adjustment component includes a compound lens. In certain embodiments, the light adjustment component includes a compound lens and one or more aperture stops, such as where the one or more aperture stops are positioned in the light adjustment component at the focal points of the compounds lens. The light adjustment component in certain instances includes a telecentric lens. In some instances, the light adjustment component includes an object-space telecentric lens. In some instances, the light adjustment component includes an image-space telecentric lens. In certain instances, the light adjustment component includes a double telecentric lens (e.g., a bi-telecentric lens).

In embodiments, light collected from the particle is continuously conveyed to different positions along the birefringent polarizing interferometer (e.g., at different positions along a first polarizer as described in greater detail below). Depending on the rate of the flow stream (i.e., the rate of particle propagation), light may be conveyed along the birefringent polarizing interferometer at a rate of 0.000001 mm/second or more, such as 0.000005 mm/second or more, such as 0.00001 mm/second or more, such as 0.00005 mm/second or more, such as 0.0001 mm/second or more, such as 0.0005 mm/second or more, such as 0.001 mm/second or more, such as 0.005 mm/second or more, such as 0.01 mm/second or more, such as 0.05 mm/second or more, such as 0.1 mm/second or more, such as 0.5 mm/second or more and including 1 mm/second or more.

In some embodiments, the birefringent polarizing interferometer is configured to generate two separated beams of polarized light that produce an interference pattern (e.g., an interferogram) at a photodetector. In some embodiments, the birefringent polarizing interferometer includes a first polarizer, a second polarizer, a prism and a lens. The term "polarizer" is used herein in its conventional sense to refer to an optical adjustment component that is configured to pass light having a predetermined polarization and blocking light waves having other polarizations. Polarizers as described herein may be any convenient optical polarizer, including but not limited to, a linear polarizer, an absorptive polarizer, a beam-splitting polarizer, a birefringent polarizer, a thin film polarizer, a wire grid polarizer, a circular polarizer and an optical polarizer configured for polarization by Fresnel reflection.

In some instances, the birefringent polarizing interferometer includes a first polarizer (e.g., an input polarizer) which receives the light (e.g., collimated, perpendicularly incident light) from the light adjustment component and polarizes the light at a predetermined angle relative to the optical axis of the prism. In some embodiments, the first polarizer generates linearly polarized light at an angle of from 30° to 60° relative to the optical axis of the prism, such as from 35° to 55°, such as from 40° to 50° and including linearly polarized light at an angle of 45° relative to the optical axis of the prism.

In some instances, polarized light from the first polarizer is split into two beams of light by the prism of the birefringent polarizing interferometer. In certain instances, the prism is configured to split the light beam from the first polarizer into two beams of polarized light having orthogonal polarizations. In some embodiments, the prism is positioned in the birefringent polarizing interferometer such that the centerline of the prism is along the optical axis of the light adjustment component (i.e., the centerline of the prism is positioned at the centerline position of the light adjustment component). In certain instances, the prism is a Wollaston prism. Depending on the type of prism (e.g., where the prism is a Wollaston prism), the two beams of light generated by the prism are divided by a separating angle which ranges from 5° to 75°, such as from 10° to 70°, such as from 15° to 65°, such as from 20° to 60°, such as from 25° to 55° and including from 30° to 50°. The prism may be positioned at any suitable distance from the first polarizer, such as 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more.

In some instances, the two beams of light generated by the prism are conveyed through a second polarizer (e.g., an output polarizer) which receives the two beams of light from the prism and generates orthogonally polarized beams of light which are configured to interfere. In certain instances, the second polarizer generates beams of polarized light that constructively interfere at the photodetector. In other instances, the second polarizer generates beams of polarized light that destructively interfere at the photodetector.

In some embodiments, the polarized beams of light from the second polarizer of the birefringent polarizing interferometer are configured to interfere at the surface of a photodetector (i.e., generate an interferogram at the photodetector surface). In other embodiments, the polarized beams of light from the second polarizer of the birefringent polarizing interferometer are configured to interfere at a predetermined distance from the surface of a photodetector, such as 0.0001 mm or more from the surface of the photodetector, such as 0.0005 mm or more, such as 0.001 mm or more, such as 0.005 mm or more, such as 0.01 mm or more, such as 0.05 mm or more, such as 0.1 mm or more, such as 0.5 mm or more, such as 1 mm or more, such as 5 mm or more and including 10 mm or more from the surface of the photodetector.

In some embodiments, the beams of light from the second polarizer are conveyed through an optical adjustment component. As described above, the optical adjustment component may include lens, mirrors, collimators, pinholes, slits, beam splitters, among other types of optical adjustment components. In some instances, the beams of light from the second polarizer are propagated to interfere at the photodetector through a focusing lens. In some instances, the beams of light from the second polarizer are propagated to the photodetector through an objective lens. The properties of the objective lens may vary. For example, the numerical aperture of the subject objective lens may also vary, ranging from 0.01 to 1.7, such as from 0.05 to 1.6, such as from 0.1 to 1.5, such as from 0.2 to 1.4, such as from 0.3 to 1.3, such as from 0.4 to 1.2, such as from 0.5 to 1.1 and including a numerical aperture ranging from 0.6 to 1.0. Likewise, the focal length of the objective lens varies, ranging from 10 mm to 20 mm, such as from 10.5 mm to 19 mm, such as from 11 mm to 18 mm and including from 12 mm to 15 mm.

One or more components of the birefringent polarizing interferometer, such as the first polarizer, the prism or the second polarizer may be configured to be moved in an X-Y plane. In these embodiments, the component of the birefringent polarizing interferometer may be configured to be moved continuously or in discrete intervals. In some embodiments, movement of the optical component is continuous. In other embodiments, the optical component is movable in discrete intervals, such as for example in 0.01 micron or greater increments, such as 0.05 micron or greater, such as 0.1 micron or greater, such as 0.5 micron or greater, such as 1 micron or greater, such as 10 micron or greater, such as 100 microns or greater, such as 500 microns or greater, such as 1 mm or greater, such as 5 mm or greater, such as 10 mm or greater and including 25 mm or greater increments. In certain instances, the prism (e.g., Wollaston prism) is configured to be moved, such as to adjust the centerline of the prism relative to one or more of the first polarizer, the second polarizer or the light adjustment component. For example, the prism may be moved such that the centerline of the prism is moved by 0.01 micron or greater from the centerline of the light adjustment component, such as by 0.05 micron or greater, such as by 0.1 micron or greater, such as by 0.5 micron or greater, such as by 1 micron or greater, such as by 10 micron or greater, such as by 100 microns or greater, such as by 500 microns or greater, such as by 1 mm or greater, such as by 5 mm or greater, such as by 10 mm or greater and including by 25 mm or greater from the centerline of the light adjustment component.

Any displacement protocol may be employed to move the optical adjustment component structures, such as coupled to a movable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

Photodetectors of the subject systems may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments of the present disclosure, the photodetector may be configured to detect light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths.

Photodetectors may be configured to measure light continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The photodetectors may be configured to take measurements of the light one or more times during each discrete time interval, such as 2 or more times, such as 3 or more times, such as 5 or more times and including 10 or more times. In certain embodiments, light is measured by the photodetector 2 or more times, with the data in certain instances being averaged.

The interference patterns generated by the birefringent polarizing interferometer as the particle is propagated through the flow stream may be detected in one or more photodetector channels, such as 2 or more, such as 3 or more, such as 4 or more, such as 5 or more, such as 6 or more, such as 7 or more, such as 8 or more, such as 9 or more and including 10 or more photodetector channels. In some embodiments, interference patterns generated by the birefringent polarizing interferometer as the particle is propagated through the flow stream is detected in each photodetector channel, such as where each interference pattern is detected in a distinct photodetector channel, such as where two or more interference patterns are detected in a photodetector channel, such as where three or more interference patterns are detected in a photodetector channel, such as where four or more interference patterns are detected in a photodetector channel, such as where five or more interference patterns are detected in a photodetector channel, such as where 10 or more interference patterns are detected in a photodetector channel, such as where 25 or more interference patterns are detected in a photodetector channel.

In embodiments, systems further include a processor configured to transform the photodetector signal pulses into spectral data signals. In some instances, the memory includes instructions stored thereon for generating the spectral data signals by performing a Fourier transform (FT) of the photodetector signal pulses. In some instances, the memory includes instructions stored thereon for generating the spectral data signals by performing a discrete Fourier transform (dFT) of the photodetector signal pulses. In some instances, the memory includes instructions stored thereon for generating the spectral data signals by performing a short-time Fourier transform (STFT) of the photodetector signal pulses.

In some embodiments, the path difference introduced by the prism (e.g., Wollaston prism) of the birefringent polarizing interferometer between orthogonal polarization states of a normally incident ray with a small splitting angle is given by the approximation:

$$\Delta \approx 2hb \tan \theta$$

where h is the displacement of the ray from the centerline of the prism, $b=(n_o-n_e)$ is the birefringence of the prism material where $n_o$ and $n_e$ are the ordinary and extraordinary refractive indices and $\theta$ is the prism wedge angle.

In some instances, the output rays are resolved into a common polarization state by the output polarizer, and brought to a focus on the detector where they interfere with a mutual path difference, $\Delta$.

Translation of the particle varies h that introduces a time varying path difference between the two components, enabling an interferogram to be recorded as a function of particle displacement. The prism is scanned transversely to produce the temporal interferogram at the photodetector as described above.

The recorded interference pattern (i.e., interferogram $I(\Delta)$) may be expressed in the form of (cosine) Fourier transform $$I(\Delta) = \int_0^\infty d\upsilon \, S(\upsilon) \cos(2\pi\upsilon\Delta)$$

where $S(\upsilon)$ is the spectrum of the light expressed in wavenumbers $\upsilon=1/\lambda$ (the inverse of the wavelength or the spatial frequency).

In some instances, the Fourier transform allows for calculating the spectrum $S(\upsilon)$ from the interferogram $I(\Delta)$. For example, the inverse cosine Fourier transform can be expressed by:

$$S(\upsilon) = \int_0^\infty d\Delta I(\Delta) \cos(2\pi\upsilon\Delta)$$

In certain instances, the memory includes instructions stored thereon for transforming the photodetector signal pulses into a spectrum based on the interference patterns detected by the photodetector. In some embodiments, the photodetector signal pulses are transformed into a spectrum having wavelengths that range from 100 nm to 1500 nm, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm. In certain instances, the photodetector signal pulses are transformed into a spectrum having wavelengths that range from 360 nm to 960 nm.

In some embodiments, the transformed data signal has a unique shape or pattern. In certain embodiments, each transformed data signal has an identifiable shape or pattern, such as where the transformed data signal can be used to identify the components of the particle (e.g., fluorophores) or one or more parameters of the particle (e.g., particle shape, size). In certain embodiments, the memory includes instructions stored thereon for characterizing the fluorophore abundance of the particle based on the transformed data signal. In other embodiments, the memory includes instructions stored thereon for identifying the types of fluorophores on the particle based on the transformed data signal. In other embodiments, the memory includes instructions stored thereon for characterizing the size of the particle based on the transformed data signal. In other embodiments, the memory includes instructions stored thereon for characterizing the center of mass of the particle based on the transformed data signal. In other embodiments, the memory includes instructions stored thereon for characterizing the orientation of the particle based on the transformed data signal. In other embodiments, the memory includes instructions stored thereon for characterizing the eccentricity of the particle based on the transformed data signal. In other embodiments, the memory includes instructions stored thereon for determining if the co-localization coefficient (i.e., the degree of co-localization) of the particle based on the photodetector signal pulse. In some embodiments, the memory includes instructions stored thereon which when executed by the processor, cause the processor to identify the particle in the flow stream based on the transformed data signal. In some embodiments, the memory includes instructions for generating a sort decision for the particle based on the transformed data signal.

FIG. 1 depicts a light detection system according to certain embodiments. System 100 includes a light source 101 that is configured to irradiate particle 102a as it propagates through flow stream 102. A beam of light 102b from irradiated particle 102a is propagated through light adjustment component 103 (e.g., a double telecentric lens) to a position on birefringent polarizing interferometer 104 (e.g., a first input polarizer of the birefringent polarizing interferometer). Light beam 102b is displaced from the central optical axis of light adjustment component 103 by a distance h, which distance depends on the position the particle is propagating in flow stream 102 when irradiated by light source 101. As described above, as particle 102a propagates through flow stream 102, light beams emanating from light adjustment component 103 will have changing distances h from the central axis of light adjustment component 103. In system 100, the central optical axis of light adjustment component 103 is in line with the centerline of birefringent polarizing interferometer 104. Light beam 102b is conveyed to birefringent polarizing interferometer 104 which generates interfering beams of lights and an interference pattern is imaged at photodetector 105 with a focusing lens. Photodetector 105 generates data signals in response to the interference patterns as the particle propagates through flow stream 102. Interferograms are transformed to spectral data signals with a Fourier transform module 107. In certain instances, the transformed data signals from the Fourier transform a shape or pattern that is unique to particle 102a.

Figure 2:
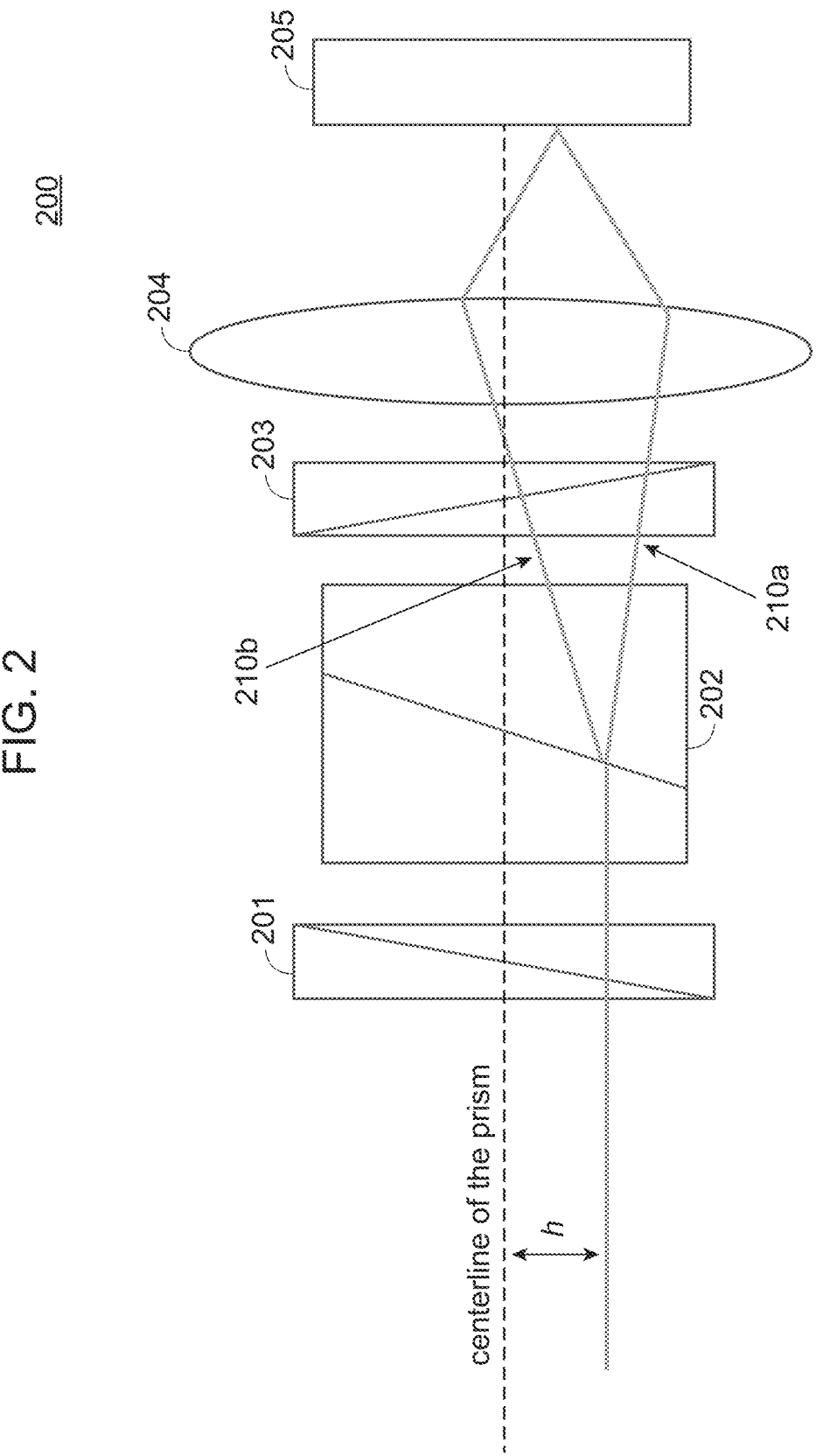
FIG. 2 depicts a birefringent polarizing interferometer according to certain embodiments.

FIG. 2 depicts a birefringent polarizing interferometer according to certain embodiments. Birefringent polarizing interferometer 200 includes a first polarizer 201 (i.e., input polarizer) which receives the light (e.g., collimated, perpendicularly incident light) from a light adjustment component and polarizes the light (e.g., at 45° relative to the optical axis of the prism). Polarized light from first polarizer 201 is split into two beams of light by Wollaston prism 202. Light beam 210 is displaced from the centerline of Wollaston prism 202 by a distance h, which distance depends on the position the particle is propagating in flow stream. Split beams 210a and 210b from Wollaston prism 202 are conveyed through second polarizer 203 (i.e., output polarizer) and generates orthogonally polarized beams of light. Split beams 210a and 210b are focused with lens 204 and form an interference pattern at a photodetector 205.

FIG. 3 depicts an illustration of light from a particle irradiated while being propagated through flow stream according to certain embodiments. A particle 302 is irradiated with light source 301 in a flow stream and light from the irradiated particle is continuously collected (illustrated as five different beams 302a, representative of different positions of the particle in the flow stream) Light from the particle is continuously conveyed through light adjustment component 303 and light from the irradiated particle is displaced from the central axis of light adjustment component 303 by a changing distance depending on where the particle is in the flow stream when irradiated. Since light from the irradiated particle is displaced from the central axis by changing distances depending on the position of the propagating particle in the flow stream, light will be conveyed through a different position on the input polarizer of birefringent polarizing interferometer 304.

In certain embodiments, systems further include a flow cell configured to propagate the particle in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be1 µL/min or more, such as 2 µL/min or more, such as 3 µL/min or more, such as 5 µL/min or more, such as 10 µL/min or more, such as 15 µL/min or more, such as 25 µL/min or more, such as 50 µL/min or more and including 100 µL/min or more, where in some instances the rate of sample conveyed to the flow cell chamber by the sample injection port is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 µL/min (microliter per minute) or more, such as 2 µL/min or more, such as 3 µL/min or more, such as 5 µL/min or more, such as 10 µL/min or more, such as 25 µL/min or more, such as 50 µL/min or more, such as 75 µL/min or more, such as 100 µL/min or more, such as 250 µL/min or more, such as 500 µL/min or more, such as 750 µL/min or more and including 1000 µL/min or more. For example, the system may include a pump that is configured to flow sample through the flow cell at a rate that ranges from 1 µL/min to 500 µL/min, such as from 1 µL/min to 250 µL/min, such as from 1 µL/min to 100 µL/min, such as from 2 µL/min to 90 µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

In certain embodiments, the subject systems are flow cytometric systems. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In some embodiments, methods include sorting components of a sample, such as described in U.S. Pat. Nos.

10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosures of which are herein incorporated by reference in their entirety. In some embodiments, methods for sorting components of sample include sorting particles (e.g., cells in a biological sample) with an enclosed particle sorting module, such as those described in U.S. Patent Publication No. 2017/0299493, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

Figure 4A:
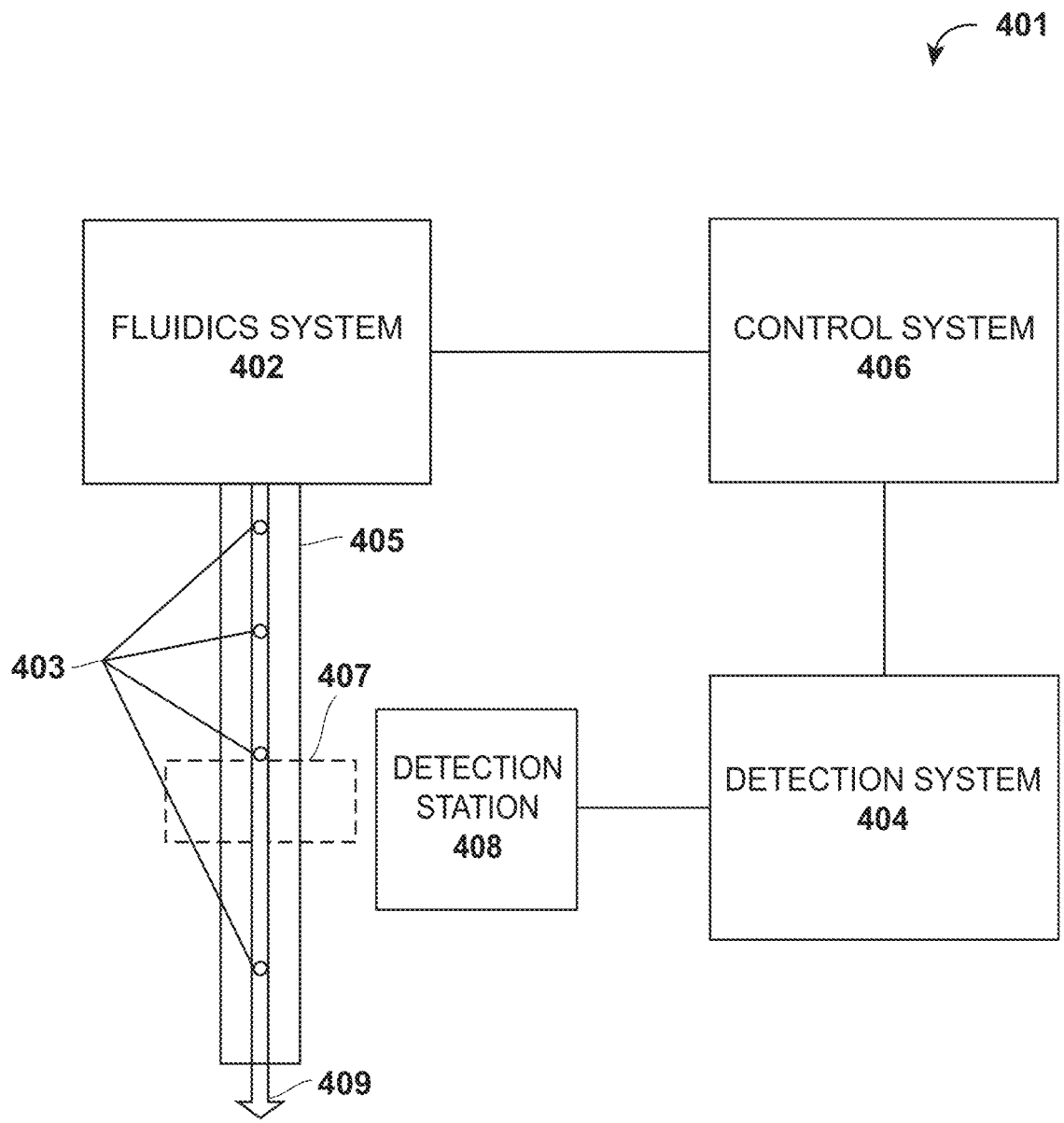
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
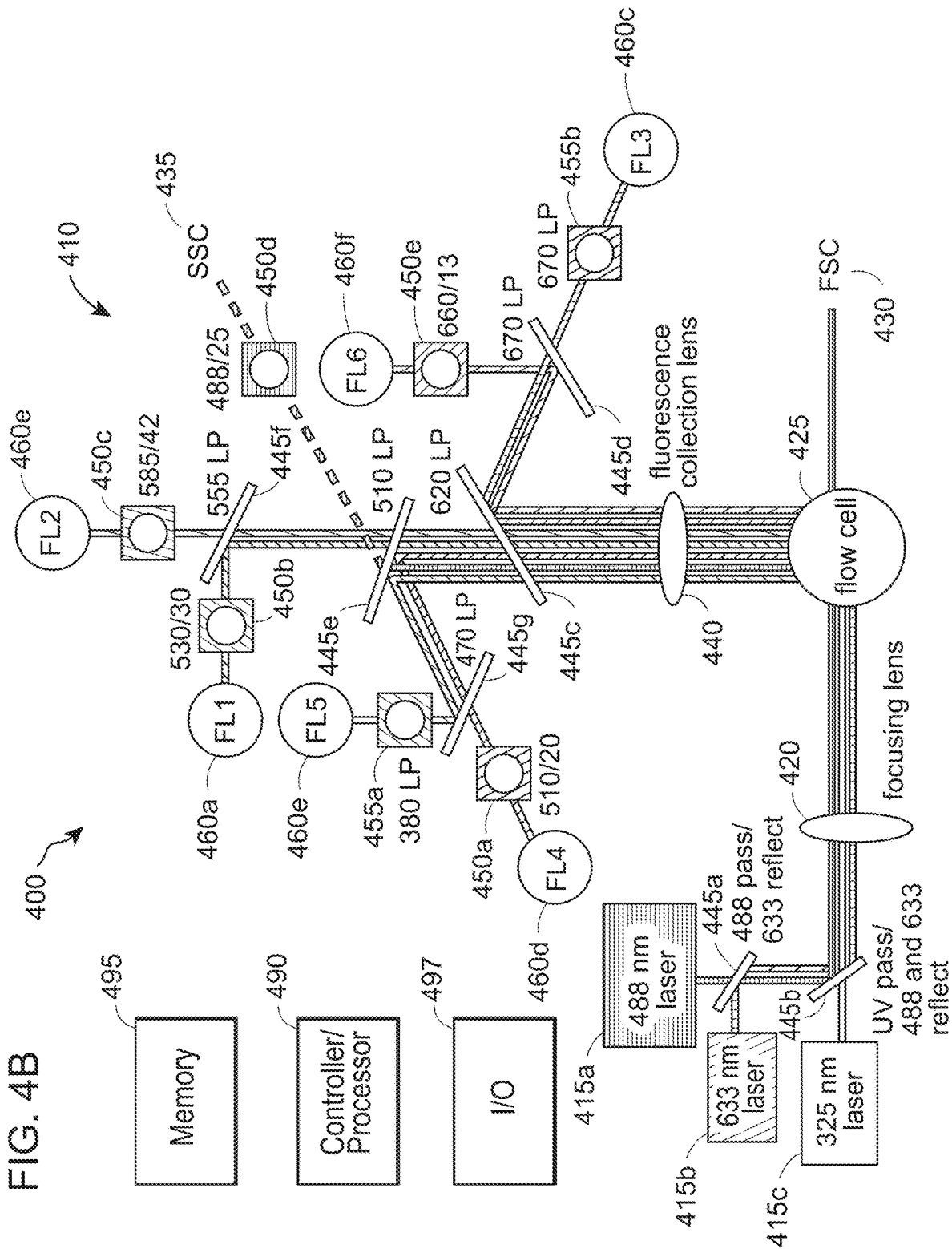
FIG. 4B depicts a flow cytometer according to certain embodiments.

In some embodiments, an example of a flow cytometry system is shown in FIG. 4B. System 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
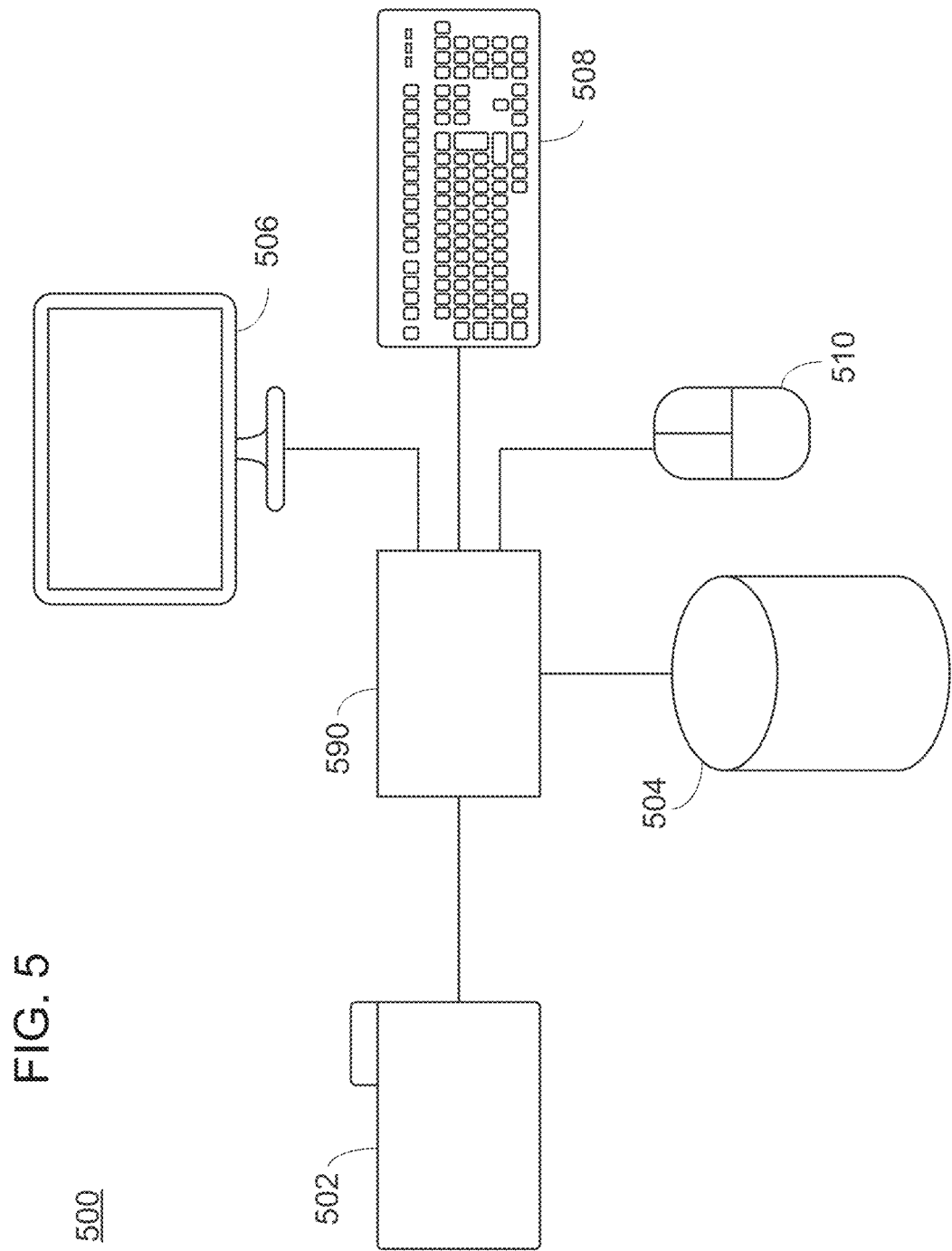
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. In some embodiments, the particle analyzer includes the Fourier transform module configured to transform the interferograms generated by the photodetector into spectral data signals by one or more of a Fourier transform, a discrete Fourier transform and a short-time Fourier transform. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate.

The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
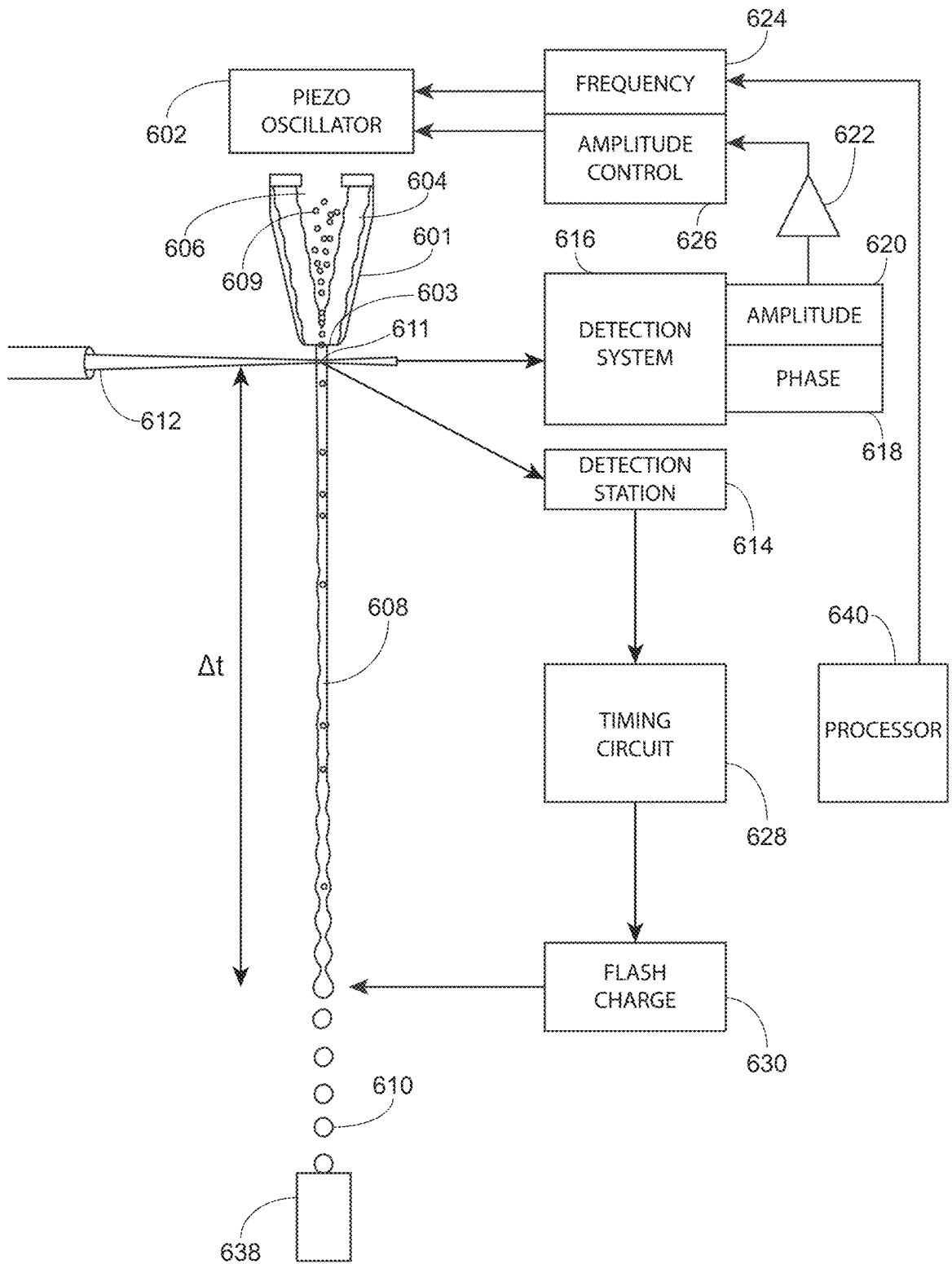
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
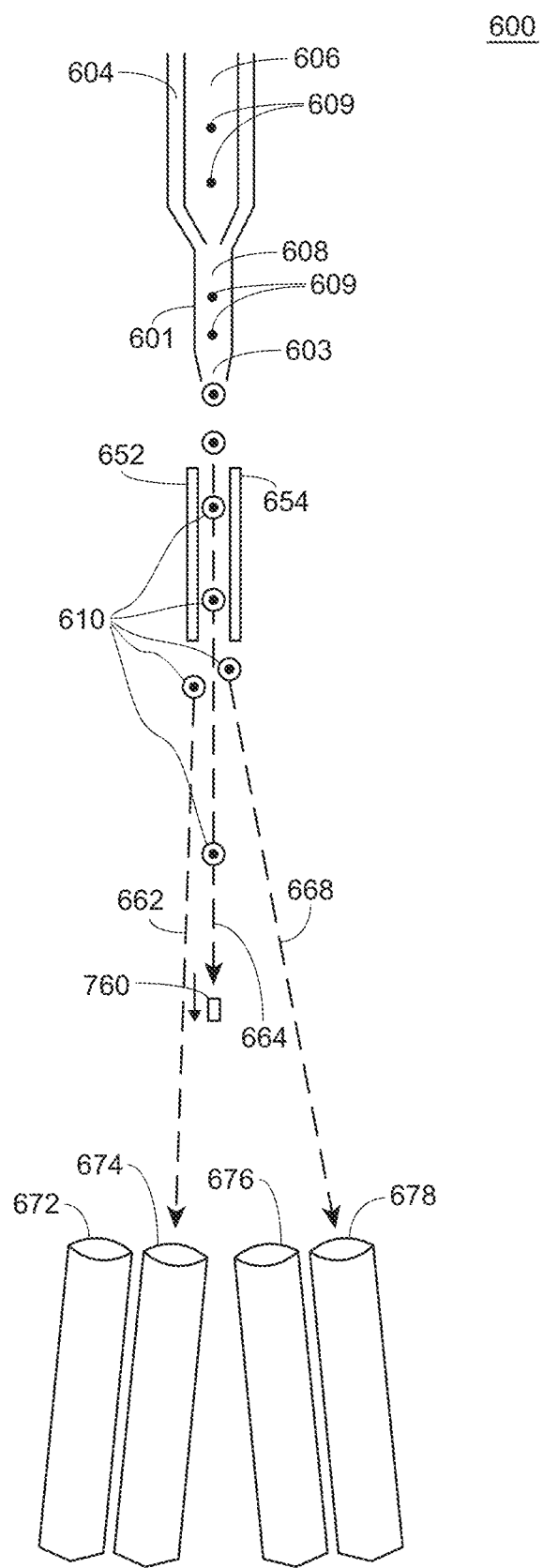
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating with a light source a particle propagating through a flow stream, continuously conveying with a light adjustment component light from the irradiated particle across different positions on a birefringent polarizing interferometer as the particle is propagated through the flow stream, generating with the birefringent polarizing interferometer interference patterns of interfering polarized beams of light, detecting the interference patterns with a photodetector and generating a photodetector signal pulse in response to each detected interference pattern. In some embodiments, the computer controlled systems include memory having instructions stored thereon for transforming the photodetector signal pulses into spectral data signals.

In some embodiments, the computer controlled systems include memory having instructions stored thereon for identifying the particle based on the transformed data signals. In some embodiments, the computer controlled systems include memory having instructions stored thereon for characterizing the size of the particle based on the transformed data signals. In other embodiments, the computer controlled systems include memory having instructions stored thereon for characterizing the center of mass of the particle based on the transformed data signals. In other embodiments, the computer controlled systems include memory having instructions stored thereon for characterizing the orientation of the particle based on the transformed data signals. In other embodiments, the computer controlled systems include memory having instructions stored thereon for characterizing the eccentricity of the particle based on the transformed data signals. In other embodiments, the computer controlled systems include memory having instructions stored thereon for determining if the co-localization coefficient (i.e., the degree of co-localization) of the particle based on the transformed data signals. In certain embodiments, the computer controlled systems include memory having instructions for generating a sort decision for the particle based on the transformed data signals.

In some embodiments, computer controlled systems include a Fourier transform module configured to apply a Fourier transform to the photodetector data signals to generate spectral signals from the interferograms collected by the subject light detection systems. In some embodiments, the computer controlled systems include memory having instructions for expressing the recorded interference pattern (i.e., interferogram/(Δ)) in the form of (cosine) Fourier transform $$I(\Delta) = \int_0^\infty d\upsilon \ S(\nu) \cos (2\pi\upsilon\Delta)$$

where S(υ) is the spectrum of the light expressed in wavenumbers υ=1/λ (the inverse of the wavelength or the spatial frequency).

In some instances, the computer controlled systems include memory having instructions for calculating by Fourier transform the spectrum S(υ) from the interferogram I(Δ) by the expression:

$$S(\upsilon) = \int_0^\infty d\Delta I(\Delta) \cos (2\pi\upsilon\Delta)$$

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 7:
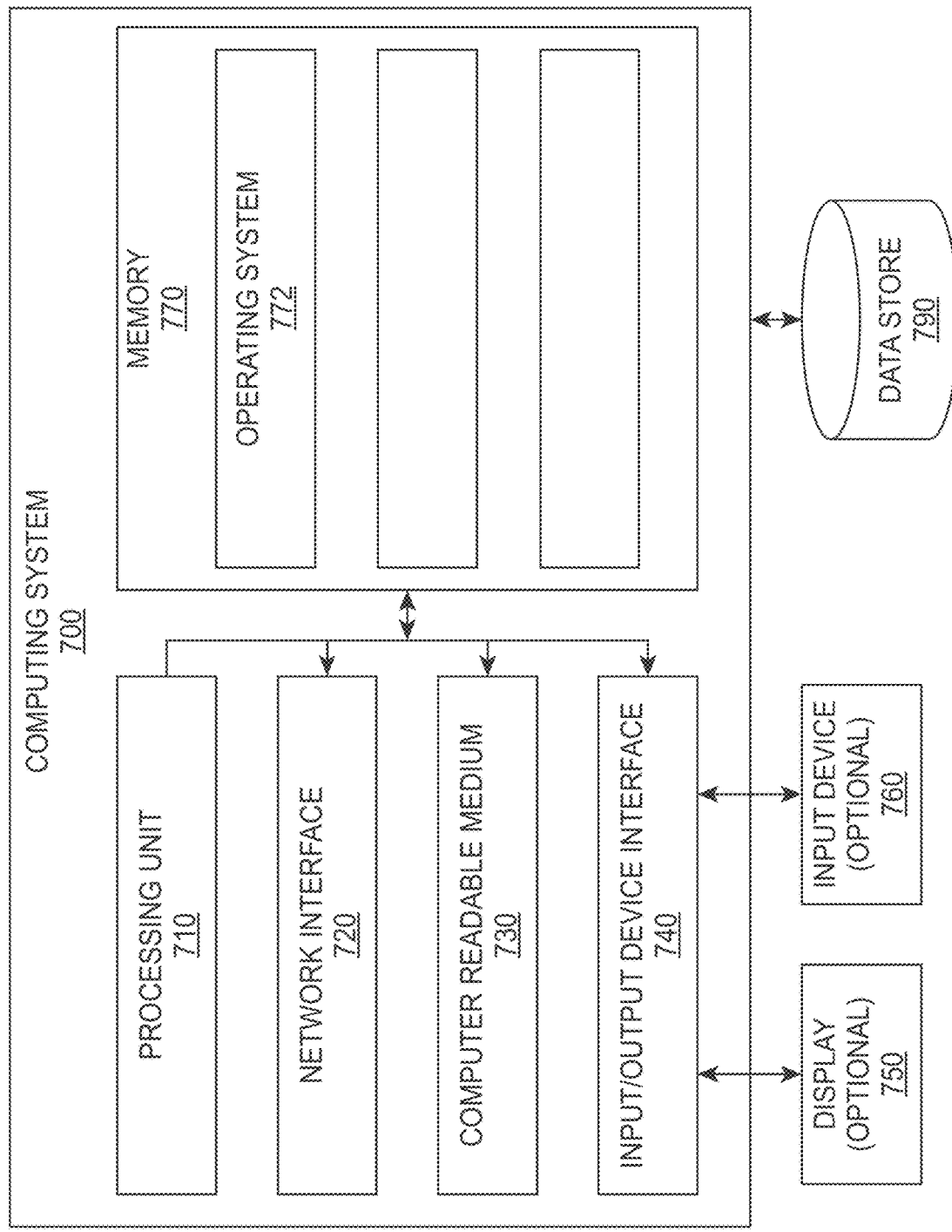
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Methods for Detecting Light from Particles in a Flow Stream by Birefringent Interferometry As summarized above, aspects of the disclosure also include methods for detecting light from a particle in a flow stream by birefringent interferometry. Methods according to certain embodiments include irradiating with a light source a particle propagating through a flow stream, continuously conveying with a light adjustment component light from the irradiated particle across different positions on a birefringent polarizing interferometer as the particle is propagated through the flow stream, generating with the birefringent polarizing interferometer interference patterns of interfering polarized beams of light, detecting the interference patterns with a photodetector, generating a photodetector signal pulse in response to each detected interference pattern and transforming the photodetector signal pulses into spectral data signals.

Methods according to certain embodiments include irradiating a particle propagating through the flow stream across an interrogation region of the flow stream of 5 µm or more, such as 10 µm or more, such as 15 µm or more, such as 20 µm or more, such as 25 µm or more, such as 50 µm or more, such as 75 µm or more, such as 100 µm or more, such as 250 µm or more, such as 500 µm or more, such as 750 µm or more, such as for example across an interrogation region of 1 mm or more, such as 2 mm or more, such as 3 mm or more, such as 4 mm or more, such as 5 mm or more, such as 6 mm or more, such as 7 mm or more, such as 8 mm or more, such as 9 mm or more and including 10 mm or more.

In some embodiments, the methods include irradiating the particle in the flow stream with a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, methods may include irradiating the particle in the flow stream with a continuous light source that provides for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less.

In other embodiments, the methods include irradiating the particle propagating through the flow stream with a pulsed light source, such as where light is emitted at predetermined time intervals, each time interval having a predetermined irradiation duration (i.e., pulse width). In certain embodiments, methods include irradiating the particle with the pulsed light source in each interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

As described above, the particle may be irradiated with any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, methods include irradiating the particle with a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

The particle in the flow stream may be irradiated by the light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the flow stream may be at any suitable angle such as at an angle ranging from 10° to 90°, such as from 15° to 85°, such as from 20° to 80°, such as from 25° to 75° and including from 30° to 60°, for example at a 90° angle.

In practicing the subject methods, light from the irradiated particle is continuously conveyed through a light adjustment component to different positions on a birefringent polarizing interferometer as the particle is propagated through the flow stream. In some instances, light conveyed from the irradiated particle is emitted light such as fluorescence from the particle. In some instances, light conveyed from the irradiated particle is scattered light. In some cases, the scattered light is forward scattered light. In some cases, the scattered light is backscattered light. In some cases, the scattered light is side scattered light. In some instances light conveyed from the irradiated particle is transmitted light. Light from the particle is continuously conveyed to different positions along the birefringent polarizing interferometer as the particle propagates through the flow stream with a light adjustment component. In some instances, the light adjustment component is configured to expand the spatial separation of the light collected from the particle in the flow stream. In some instances, the light adjustment component expands the spatial separation by 5% or more, such as by 10% or more, such as by 25% or more, such as by 50% or more, such as by 75% or more, such as by 90% or more. In certain instances, the light adjustment component expands the spatial separation by 1.1-fold or more, such as by 1.2-fold or more, such as by 1.3-fold or more, such as by 1.4-fold or more, such as by 1.5-fold or more, such as by 2-fold or more, such as by 3-fold or more, such as by 4-fold or more, such as by 5-fold or more, such as by 6-fold or more, such as by 7-fold or more, such as by 8-fold or more, such as by 9-fold or more and including by 10-fold or more.

The light adjustment component may be any convenient optical protocol for collecting and propagating light from the particle to the birefringent polarizing interferometer. In some embodiments, the light adjustment component collimates the light collected from the particle and conveys collimated light to the birefringent polarizing interferometer. In some embodiments, the light adjustment component conveys incident light from the irradiated particle to the birefringent polarizing interferometer at an angle that varies from 60° to 90° relative to the surface of the birefringent polarizing interferometer, such as from 65° to 90°, such as from 70° to 90°, such as from 75° to 90°, 80° to 90° and including from 85° to 90° relative to the surface of the birefringent polarizing interferometer. In certain embodiments, the light adjustment component conveys perpendicularly incident light from the irradiated particle to the surface of the birefringent polarizing interferometer (i.e., the incident light from the light adjustment component is orthogonal to the surface of the birefringent polarizing interferometer)

The light adjustment component may be any convenient optical protocol for collecting and continuously conveying light along the birefringent polarizing interferometer from the particle propagating through the flow stream. In some embodiments, the light adjustment component includes a compound lens. In certain embodiments, the light adjustment component includes a compound lens and one or more aperture stops, such as where the one or more aperture stops are positioned in the light adjustment component at the focal points of the compounds lens. The light adjustment component in certain instances includes a telecentric lens. In some instances, the light adjustment component includes an object-space telecentric lens. In some instances, the light adjustment component includes an image-space telecentric lens. In certain instances, the light adjustment component includes a double telecentric lens (e.g., a bi-telecentric lens).

In embodiments, light collected from the particle is continuously conveyed to different positions along the birefringent polarizing interferometer (e.g., at different positions along a first polarizer as described in greater detail below). Depending on the rate of the flow stream (i.e., the rate of particle propagation), light may be conveyed along the birefringent polarizing interferometer at a rate of 0.000001 mm/second or more, such as 0.000005 mm/second or more, such as 0.00001 mm/second or more, such as 0.00005 mm/second or more, such as 0.0001 mm/second or more, such as 0.0005 mm/second or more, such as 0.001 mm/second or more, such as 0.005 mm/second or more, such as 0.01 mm/second or more, such as 0.05 mm/second or more, such as 0.1 mm/second or more, such as 0.5 mm/second or more and including 1 mm/second or more.

In some embodiments, the birefringent polarizing interferometer is configured to generate two separated beams of polarized light that produce an interference pattern (e.g., an interferogram) at a photodetector. Polarized light may be generated using any convenient optical polarizer, including but not limited to, a linear polarizer, an absorptive polarizer, a beam-splitting polarizer, a birefringent polarizer, a thin film polarizer, a wire grid polarizer, a circular polarizer and an optical polarizer configured for polarization by Fresnel reflection.

In some instances, the birefringent polarizing interferometer includes a first polarizer (e.g., an input polarizer) which receives the light (e.g., collimated, perpendicularly incident light) from the light adjustment component and polarizes the light at a predetermined angle relative to the optical axis of the prism. In some embodiments, the first polarizer generates linearly polarized light at an angle of from 30° to 60° relative to the optical axis of the prism, such as from 35° to 55°, such as from 40° to 50° and including linearly polarized light at an angle of 45° relative to the optical axis of the prism.

In some instances, polarized light from the first polarizer is split into two beams of light by the prism of the birefringent polarizing interferometer. In certain instances, the prism is configured to split the light beam from the first polarizer into two beams of polarized light having orthogonal polarizations. In some embodiments, the prism is positioned in the birefringent polarizing interferometer such that the centerline of the prism is along the optical axis of the light adjustment component (i.e., the centerline of the prism is positioned at the centerline position of the light adjustment component). In certain instances, the prism is a Wollaston prism. Depending on the type of prism (e.g., where the prism is a Wollaston prism), the two beams of light generated by the prism are divided by a separating angle which ranges from 5° to 75°, such as from 10° to 70°, such as from 15° to 65°, such as from 20° to 60°, such as from 25° to 55° and including from 30° to 50°. The prism may be positioned at any suitable distance from the first polarizer, such as 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more.

In some instances, the two beams of light generated by the prism are conveyed through a second polarizer (e.g., an output polarizer) which receives the two beams of light from the prism and generates orthogonally polarized beams of light which are configured to interfere. In certain instances, the second polarizer generates beams of polarized light that constructively interfere at the photodetector. In other instances, the second polarizer generates beams of polarized light that destructively interfere at the photodetector.

In some embodiments, the polarized beams of light from the second polarizer of the birefringent polarizing interferometer are configured to interfere at the surface of a photodetector (i.e., generate an interferogram at the photodetector surface). In other embodiments, the polarized beams of light from the second polarizer of the birefringent polarizing interferometer are configured to interfere at a predetermined distance from the surface of a photodetector, such as 0.0001 mm or more from the surface of the photodetector, such as 0.0005 mm or more, such as 0.001 mm or more, such as 0.005 mm or more, such as 0.01 mm or more, such as 0.05 mm or more, such as 0.1 mm or more, such as 0.5 mm or more, such as 1 mm or more, such as 5 mm or more and including 10 mm or more from the surface of the photodetector.

In some embodiments, the beams of light from the second polarizer are conveyed through an optical adjustment component. As described above, the optical adjustment component may include lens, mirrors, collimators, pinholes, slits, beam splitters, among other types of optical adjustment components. In some instances, the beams of light from the second polarizer are propagated to interfere at the photodetector through a focusing lens. In some instances, the beams of light from the second polarizer are propagated to the photodetector through an objective lens. The properties of the objective lens may vary. For example, the numerical aperture of the subject objective lens may also vary, ranging from 0.01 to 1.7, such as from 0.05 to 1.6, such as from 0.1 to 1.5, such as from 0.2 to 1.4, such as from 0.3 to 1.3, such as from 0.4 to 1.2, such as from 0.5 to 1.1 and including a numerical aperture ranging from 0.6 to 1.0. Likewise, the focal length of the objective lens varies, ranging from 10 mm to 20 mm, such as from 10.5 mm to 19 mm, such as from 11 mm to 18 mm and including from 12 mm to 15 mm.

One or more components of the birefringent polarizing interferometer, such as the first polarizer, the prism or the second polarizer may be moved in an X-Y plane. In these embodiments, the component of the birefringent polarizing interferometer may be moved continuously or in discrete intervals. In some embodiments, movement of the optical component is continuous. In other embodiments, the optical component is movable in discrete intervals, such as for example in 0.01 micron or greater increments, such as 0.05 micron or greater, such as 0.1 micron or greater, such as 0.5 micron or greater, such as 1 micron or greater, such as 10 micron or greater, such as 100 microns or greater, such as 500 microns or greater, such as 1 mm or greater, such as 5 mm or greater, such as 10 mm or greater and including 25 mm or greater increments. In certain instances, the prism (e.g., Wollaston prism) is configured to be moved, such as to adjust the centerline of the prism relative to one or more of the first polarizer, the second polarizer or the light adjustment component. For example, the prism may be moved such that the centerline of the prism is moved by 0.01 micron or greater from the centerline of the light adjustment component, such as by 0.05 micron or greater, such as by 0.1 micron or greater, such as by 0.5 micron or greater, such as by 1 micron or greater, such as by 10 micron or greater, such as by 100 microns or greater, such as by 500 microns or greater, such as by 1 mm or greater, such as by 5 mm or greater, such as by 10 mm or greater and including by 25 mm or greater from the centerline of the light adjustment component.

Any displacement protocol may be employed to move the optical adjustment component structures, such as coupled to a movable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

Interference patterns generated by the birefringent polarizing interferometer is focused at a photodetector (e.g., at the surface of the photodetector). In some embodiments, the interference patterns generated by birefringent polarizing interferometer are detected with one or more photodetectors, such as 2 or more, such as 3 or more, such as 4 or more, such as 5 or more, such as 6 or more, such as 7 or more, such as 8 or more, such as 9 or more and including 10 or more photodetectors. Photodetectors for practicing the subject methods may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In certain embodiments, the light from the light source is measured by the photodetector 2 or more times, with the data in certain instances being averaged.

In some embodiments, light detected from each particle in the sample is emitted light, such as particle luminescence (i.e., fluorescence or phosphorescence). In these embodiments, each particle may include one or more fluorophores which emits fluorescence in response to irradiation by the two or more light sources. For example, each particle may include 2 or more fluorophores, such as 3 or more, such as 4 or more, such as 5 or more, such as 6 or more, such as 7 or more, such as 8 or more, such as 9 or more and including 10 or more fluorophores. In some instances, each particle includes a fluorophore which emits fluorescence in response to irradiation by the light source. In some embodiments, fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, OR), Dyomics GmbH (Jena, Germany), Sigma-Aldrich (St. Louis, MO), Sirigen, Inc. (Santa Barbara, CA) and Exciton (Dayton, OH). For example, the fluorophore may include 4-acetamido-4'-isothiocyanatostilbene-2,2'disulfonic acid; acridine and derivatives such as acridine, acridine orange, acridine yellow, acridine red, and acridine isothiocyanate; allophycocyanin, phycoerythrin, peridinin-chlorophyll protein, 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5',5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein chlorotriazinyl, naphthofluorescein, and QFITC (XRITC); fluorescamine; 1R144; 1R1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; dye-conjugated polymers (i.e., polymer-attached dyes) such as fluorescein isothiocyanate-dextran as well as dyes combining two or more dyes (e.g., in tandem), polymeric dyes having one or more monomeric dye units and mixtures of two or more of the aforementioned dyes or combinations thereof.

In some instances, the fluorophore is polymeric dye. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Polymeric dyes of interest include, but are not limited to, those dyes described by Gaylord et al. in U.S. Publication Nos. 20040142344, 20080293164, 20080064042, 20100136702, 20110256549, 20110257374, 20120028828, 20120252986, 20130190193, 20160264737, 20160266131, 20180231530, 20180009990, 20180009989, and 20180163054, the disclosures of which are herein incorporated by reference in their entirety; and Gaylord et al., J. Am. Chem. Soc., 2001, 123 (26), pp 6417-6418; Feng et al., Chem. Soc. Rev., 2010, 39, 2411-2419; and Traina et al., J. Am. Chem. Soc., 2011, 133 (32), pp 12600-12607, the disclosures of which are herein incorporated by reference in their entirety.

The polymeric dye may have one or more desirable spectroscopic properties, such as a particular absorption maximum wavelength, a particular emission maximum wavelength, extinction coefficient, quantum yield, and the like (see e.g., Chattopadhyay et al., "Brilliant violet fluorophores: A new class of ultrabright fluorescent compounds for immunofluorescence experiments." Cytometry Part A, 81A (6), 456-466,2012). In some embodiments, the polymeric dye has an absorption curve between 280 nm and 475 nm. In certain embodiments, the polymeric dye has an absorption maximum (excitation maximum) in the range 280 nm and 475 nm. In some embodiments, the polymeric dye absorbs incident light having a wavelength in the range between 280 nm and 475 nm. In some embodiments, the polymeric dye has an emission maximum wavelength ranging from 400 nm to 850 nm, such as 415 nm to 800 nm, where specific examples of emission maxima of interest include, but are not limited to: 421 nm, 510 nm, 570 nm, 602 nm, 650 nm, 711 nm and 786 nm. In some instances, the polymeric dye has an emission maximum wavelength in a range selected from the group consisting of 410 nm to 430 nm, 500 nm to 520 nm, 560 nm to 580 nm, 590 nm to 610 nm, 640 nm to 660 nm, 700 nm to 720 nm, and 775 nm to 795 nm. In certain embodiments, the polymeric dye has an emission maximum wavelength of 421 nm. In some instances, the polymeric dye has an emission maximum wavelength of 510 nm. In some cases, the polymeric dye has an emission maximum wavelength of 570 nm. In certain embodiments, the polymeric dye has an emission maximum wavelength of 602 nm. In some instances, the polymeric dye has an emission maximum wavelength of 650 nm. In certain cases, the polymeric dye has an emission maximum wavelength of 711 nm. In some embodiments, the polymeric dye has an emission maximum wavelength of 786 nm. In certain instances, the polymeric dye has an emission maximum wavelength of 421 nm±5 nm. In some embodiments, the polymeric dye has an emission maximum wavelength of 510 nm±5 nm. In certain instances, the polymeric dye has an emission maximum wavelength of 570 nm±5 nm. In some instances, the polymeric dye has an emission maximum wavelength of 602 nm±5 nm. In some embodiments, the polymeric dye has an emission maximum wavelength of 650 nm±5 nm. In certain instances, the polymeric dye has an emission maximum wavelength of 711 nm±5 nm. In some cases, the polymeric dye has an emission maximum wavelength of 786 nm±5 nm. In certain embodiments, the polymeric dye has an emission maximum selected from the group consisting of 421 nm, 510 nm, 570 nm, 602 nm, 650 nm, 711 nm and 786 nm.

Specific polymeric dyes that may be employed include, but are not limited to, BD Horizon Brilliant™ Dyes, such as BD Horizon Brilliant™ Violet Dyes (e.g., BV421, BV510, BV605, BV650, BV711, BV786); BD Horizon Brilliant™ Ultraviolet Dyes (e.g., BUV395, BUV496, BUV737, BUV805); and BD Horizon Brilliant™ Blue Dyes (e.g., BB515) (BD Biosciences, San Jose, CA).

In certain embodiments, light conveyed from the irradiated particle is scattered light. The term "scattered light" is used herein in its conventional sense to refer to the propagation of light energy from the particle that are deflected from the incident beam path, such as by reflection, refraction or deflection of the beam of light. In certain instances, scattered light detected from the particle in the flow stream is forward scattered light (FSC). In other instances, scattered light detected from the particles in the flow stream is side scattered light. In yet other instances, scattered light detected from the particles in the flow stream is back-scattered light.

The interference patterns generated by the birefringent polarizing interferometer as the particle is propagated through the flow stream may be detected in one or more photodetector channels, such as 2 or more, such as 3 or more, such as 4 or more, such as 5 or more, such as 6 or more, such as 7 or more, such as 8 or more, such as 9 or more and including 10 or more photodetector channels. In some embodiments, interference patterns generated by the birefringent polarizing interferometer as the particle is propagated through the flow stream is detected in each photodetector channel, such as where each interference pattern is detected in a distinct photodetector channel, such as where two or more interference patterns are detected in a photodetector channel, such as where three or more interference patterns are detected in a photodetector channel, such as where four or more interference patterns are detected in a photodetector channel, such as where five or more interference patterns are detected in a photodetector channel, such as where 10 or more interference patterns are detected in a photodetector channel, such as where 25 or more interference patterns are detected in a photodetector channel.

In embodiments, methods further include transforming the photodetector signal pulse into spectral data signals. In some instances, methods include transforming the photodetector signal pulses into spectral data signals by performing a Fourier transform (FT) of the photodetector signal pulses. In other instances, methods include transforming the photodetector signal pulses into spectral data signals by performing a discrete Fourier transform (dFT) of the photodetector signal pulses. In other instances, methods include transforming the photodetector signal pulses into spectral data signals by performing a short-time Fourier transform (STFT) of the photodetector signal pulses.

In certain instances, the memory includes instructions stored thereon for transforming the photodetector signal pulses into a spectrum based on the interference patterns detected by the photodetector.

In some embodiments, the photodetector signal pulses are transformed into a spectrum having wavelengths that range from 100 nm to 1500 nm, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm. In certain instances, the photodetector signal pulses are transformed into a spectrum having wavelengths that range from 360 nm to 960 nm.

In some embodiments, the transformed data signal has a unique shape or pattern. In certain embodiments, each transformed data signal has an identifiable shape or pattern, such as where the transformed data signal can be used to identify the components of the particle (e.g., fluorophores) or one or more parameters of the particle (e.g., particle shape, size). In certain embodiments, methods include characterizing the fluorophore abundance of the particle based on the transformed data signal. In other embodiments, methods include identifying the types of fluorophores on the particle based on the transformed data signal. In other embodiments, methods include characterizing the size of the particle based on the transformed data signal. In other embodiments, methods include characterizing the center of mass of the particle based on the transformed data signal. In other embodiments, methods include characterizing the orientation of the particle based on the transformed data signal. In other embodiments, methods include characterizing the eccentricity of the particle based on the transformed data signal. In other embodiments, methods include determining if the co-localization coefficient (i.e., the degree of co-localization) of the particle based on the photodetector signal pulse. In some embodiments, methods include identifying the particle in the flow stream based on the transformed data signal. In some embodiments, methods include generating a sort decision for the particle based on the transformed data signal.

In certain embodiments, methods also include sorting the particle. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of a sample, such as 3 or more components, such as 4 or more components, such as 5 or more components, such as 10 or more components, such as 15 or more components and including sorting 25 or more components of the sample. In embodiments, methods including sorting cells based on the photodetector signal pulse.

A particular subpopulation of interest may then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two-dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In some embodiments, methods include sorting components of a sample, such as described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosures of which are herein incorporated by reference in their entirety. In some embodiments, methods for sorting components of sample include sorting particles (e.g., cells in a biological sample) with an enclosed particle sorting module, such as those described in U.S. Patent Publication No. 2017/0299493, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having: algorithm for irradiating with a light source a particle propagating through a flow stream, algorithm for continuously conveying with a light adjustment component light from the irradiated particle across different positions on a birefringent polarizing interferometer as the particle is propagated through the flow stream, algorithm for generating with the birefringent polarizing interferometer interference patterns of interfering polarized beams of light, algorithm for detecting the interference patterns with a photodetector, algorithm for generating a photodetector signal pulse in response to each detected interference pattern and algorithm for transforming the photodetector signal pulses into spectral data signals.

In some embodiments, the non-transitory computer readable storage medium includes instructions having an algorithm for identifying the particle based on the transformed data signal. In some embodiments, the non-transitory computer readable storage medium includes instructions having an algorithm for characterizing the size of the particle based on the transformed data signal. In other embodiments, the non-transitory computer readable storage medium includes instructions having an algorithm for characterizing the center of mass of the particle based on the transformed data signal. In other embodiments, the non-transitory computer readable storage medium includes instructions having an algorithm for characterizing the orientation of the particle based on the transformed data signal. In other embodiments, the non-transitory computer readable storage medium includes instructions having an algorithm for characterizing the eccentricity of the particle based on the transformed data signal. In other embodiments, the non-transitory computer readable storage medium includes instructions having an algorithm for determining if the co-localization coefficient (i.e., the degree of co-localization) of the particle based on the transformed data signal. In certain embodiments, the non-transitory computer readable storage medium includes instructions having an algorithm for generating a sort decision for the particle based on the transformed data signal.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Kits including one or more components of the subject systems are also provided. Kits according to certain embodiments include a double telecentric lens, a birefringent polarizing interferometer and a photodetector (e.g., a photomultiplier tube). In some embodiments, the birefringent polarizing interferometer includes a first polarizer and a second polarizer, a prism and a lens. In certain instances, the prism of the birefringent polarizing interferometer is a Wollaston prism. In some embodiments, the lens is a focusing lens. Kits may also include a flow cell nozzle as well as a cuvette for irradiating the flow stream. Kits may also include an optical adjustment component, such as lenses (e.g., a focusing lens, objective lens), mirrors, filters, fiber optics, wavelength separators, pinholes, slits, collimating protocols and combinations thereof. In certain instances, kits include one or more light sources, such as a laser, an LED, a broadband light source or a combination thereof.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to optimize particle identification, characterization and sorting. The subject methods and systems provide for detecting light using birefringent interferometry and for identifying or characterizing a particle in a flow stream. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A particle analyzer comprising:
   a light source configured to irradiate a particle propagating through a flow stream;
   a light detection system comprising:
      a birefringent polarizing interferometer configured to generate interfering polarized beams of light;
      a double telecentric lens configured to continuously convey light from the irradiated particle and maintain orthogonal incidence of the light across different positions on the birefringent polarizing interferometer as the particle is propagated through the flow stream; and
      a photodetector configured to detect interference patterns of the interfering polarized beams of light generated by the birefringent polarizing interferometer from light collected from the irradiated particle and generate a photodetector signal pulse in response to each detected interference pattern; and
   a processor comprising memory operably coupled to the processor wherein the memory comprises instructions stored thereon, which when executed by the processor, cause the processor to transform the photodetector signal pulses into spectral data signals.

2. The particle analyzer according to claim 1, wherein the light source is configured to continuously irradiate the particle propagating through the flow stream across an interrogation region of 10 µm or more.

3. The particle analyzer according to claim 1, wherein the birefringent polarizing interferometer comprises:
   a first polarizer and a second polarizer;
   a prism; and
   a lens.

4. The particle analyzer according to claim 3, wherein the prism is configured to split a light beam from the first polarizer into two beams of polarized light having orthogonal polarizations.

5. The particle analyzer according to claim 3, wherein the prism is a Wollaston prism.

6. The particle analyzer according to claim 3, wherein the light detection system further comprises a displacement component for adjusting one or more of the angle of the prism and the position of the prism.

7. The particle analyzer according to claim 3, wherein the lens is a focusing lens.

8. The particle analyzer according to claim 1, wherein the birefringent polarizing interferometer is configured to generate beams of polarized light that constructively interfere at the photodetector.

9. The particle analyzer according to claim 1, wherein the birefringent polarizing interferometer is configured to generate beams of polarized light that destructively interfere at the photodetector.

10. The particle analyzer according to claim 1, wherein the memory comprises instructions stored thereon, which when executed by the processor, cause the processor to generate the spectral data signals by performing a Fourier transform (FT) of the photodetector signal pulses.

11. The particle analyzer according to claim 1, wherein the memory comprises instructions stored thereon, which when executed by the processor, cause the processor to generate the spectral data signals by performing a discrete Fourier transform (dFT) of the photodetector signal pulses.

12. The particle analyzer according to claim 1, wherein the memory comprises instructions stored thereon, which when executed by the processor, cause the processor to generate the spectral data signals by performing a short-time Fourier transform (STFT) of the photodetector signal pulses.

13. The particle analyzer according to claim 1, wherein the memory further comprises instructions stored thereon, which when executed by the processor, cause the processor to transform the photodetector signal pulses into a spectrum based on the interference patterns detected by the photodetector.

14. The particle analyzer according to claim 13, wherein the spectrum spans wavelengths from 200 nm to 1200 nm.

15. The particle analyzer according to claim 13, wherein the spectrum spans wavelengths from 360 nm to 960 nm.

16. The particle analyzer according to claim 1, wherein the particle analyzer is configured to generate a spectrum of the light from the irradiated particle in the absence of a spectral processing module.

17. The particle analyzer according to claim 1, wherein the photodetector does not generate a spectral data signal.

* * * * *